United States Patent
Mukherjee et al.

(10) Patent No.: US 8,364,877 B2
(45) Date of Patent: Jan. 29, 2013

(54) IMPLEMENTING GANG INTERRUPTS

(75) Inventors: Shrijeet Mukherjee, Fremont, CA (US); Michael Brian Galles, Los Altos, CA (US); David Scott Feldman, McMinnville, OR (US); J. Bradley Smith, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/639,558

(22) Filed: Dec. 16, 2009

(65) Prior Publication Data

US 2011/0145462 A1    Jun. 16, 2011

(51) Int. Cl.
*G06F 13/24* (2006.01)

(52) U.S. Cl. ......... 710/269; 710/200; 710/240; 710/260

(58) Field of Classification Search .......... 710/260–269, 710/240–244, 200
See application file for complete search history.

(56) References Cited

U.S. PATENT DOCUMENTS

| | | | |
|---|---|---|---|
| 5,249,279 A | 9/1993 | Schmenk et al. ............. 395/425 |
| 6,505,268 B1 | 1/2003 | Schultz et al. ................... 711/4 |
| 6,900,074 B2 | 5/2005 | Miyamoto et al. ............ 438/108 |
| 7,071,859 B1 | 7/2006 | Baker ............................ 341/141 |
| 7,138,722 B2 | 11/2006 | Miyamoto et al. ............ 257/777 |
| 7,142,141 B1 | 11/2006 | Baker ............................ 341/141 |
| 7,197,588 B2 * | 3/2007 | Tsao et al. ..................... 710/268 |
| 7,257,658 B2 * | 8/2007 | Winkler et al. ................ 710/266 |
| 7,397,408 B2 | 7/2008 | Baker ............................ 341/155 |
| 7,590,982 B1 | 9/2009 | Weissman .......................... 718/1 |
| 7,606,958 B2 | 10/2009 | Sasage ........................... 710/260 |
| 7,624,215 B2 | 11/2009 | Axford et al. ................. 710/260 |
| 7,634,589 B2 | 12/2009 | Anand et al. ..................... 710/15 |
| 2006/0236002 A1 * | 10/2006 | Valenci .......................... 710/48 |
| 2008/0147905 A1 * | 6/2008 | Shi et al. ......................... 710/22 |
| 2008/0155137 A1 * | 6/2008 | Muppirala et al. .............. 710/39 |
| 2010/0254228 A1 * | 10/2010 | Zhu ............................... 368/108 |

* cited by examiner

*Primary Examiner* — Brian Misiura
*Assistant Examiner* — Kim Huynh
(74) *Attorney, Agent, or Firm* — Baker Botts L.L.P.

(57) ABSTRACT

A method includes receiving a first interrupt request from a first device instance of a plurality of device instances. The first interrupt request is requesting an interrupt of a processor. The method also includes updating a bit vector based on the first interrupt request. The bit vector comprises a plurality of bits representing an accumulation of interrupt requests. The method further includes generating a gang interrupt comprising the updated bit vector. The method also includes transmitting the gang interrupt to call a first device driver associated with the first interrupt request based on the bits in the bit vector.

17 Claims, 2 Drawing Sheets

IMPLEMENTING GANG INTERRUPTS

TECHNICAL FIELD

The present disclosure relates generally to interrupts and more particularly to implementing gang interrupts.

BACKGROUND

In computing, an interrupt is a message sent by a device requesting the attention of, for example, a processor. Interrupts are often used in implementing multitasking. The interrupt is designed to get the processor to pause what it is currently being processed, for example by saving its state of execution via a context switch, so as to begin processing the request associated with the interrupt. Context switching can be relatively expensive in terms of processor time and resources.

One type of interrupt, known as a message-signaled interrupt, uses different types of interrupts for different situations. Each interrupt type includes information about the interrupting device and the required task. As the number of devices and interrupt types increase, so does the demand on the processor. Eventually, there is a point at which the number of interrupts will begin to overwhelm the processor, thereby undermining any performance benefit of using interrupts to do multitasking.

BRIEF DESCRIPTION OF THE FIGURES

For a more complete understanding of particular embodiments and their advantages, reference is now made to the following description, taken in conjunction with the accompanying drawings, in which.

DESCRIPTION

Overview

The teachings of the present disclosure relate to a method that includes receiving a first interrupt request from a first device instance of a plurality of device instances. The first interrupt request is requesting an interrupt of a processor. The method also includes updating a bit vector based on the first interrupt request. The bit vector comprises a plurality of bits representing an accumulation of interrupt requests. The method further includes generating a gang interrupt comprising the updated bit vector. The method also includes transmitting the gang interrupt to call a first device driver associated with the first interrupt request based on the bits in the bit vector.

Description of Example Embodiments

Figure 1:
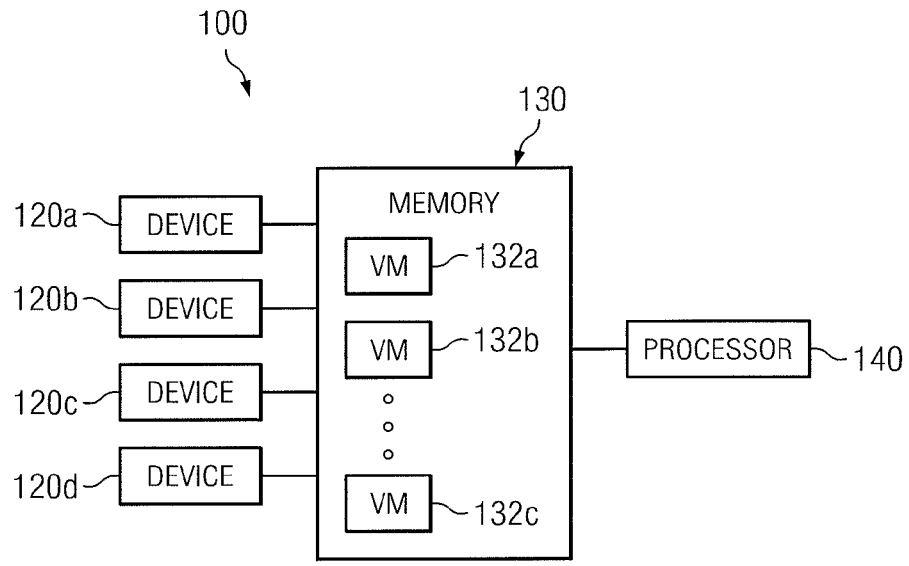
FIG. 1 illustrates a block diagram of a computer system configured to use gang interrupts, in accordance with particular embodiments.
Figure 2:
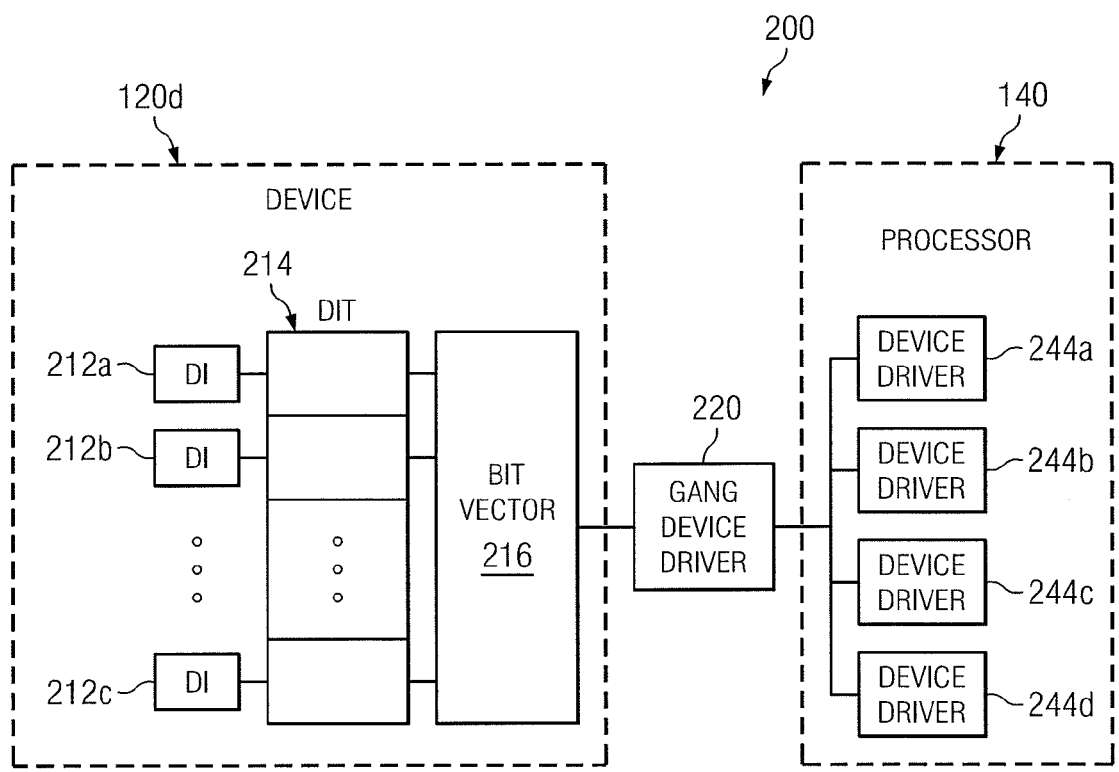
FIG. 2 illustrate a more detailed block diagram of the computer system of FIG. 1, in accordance with particular embodiments.

FIG. 1 illustrates a block diagram of a computer system configured to use gang interrupts, in accordance with particular embodiments. In the depicted embodiment, computer system 100 comprises a plurality of devices 120, memory block 130, and processor 140. Memory block 130 further comprises a plurality of virtual machines 132. As will be described in more detail below, each device 120 may include several different and unique device instances. For example, FIG. 2 depicts several different device instances 212 associated with device 120*d*.

Each device 120 may, at different times, need access to processor 140. For example, device 120*a* may need processor 140 to perform some calculation or manipulation of a piece of data. In order for a particular device, such as device 120*a*, to get processor 140 to perform the task, device 120*a* may generate an interrupt request. The interrupt request may be a request for processor 140 to stop what it is currently doing and address the request from device 120*a*. This may require processor 140 to perform a context switch. A context switch may be relatively inefficient in terms of both the time and resources of processor 140. This may be because a context switch requires processor 140 to stop its current task and store its computational state before it begins handling the interrupt.

In a typical computer system, each interrupt is individually handled. In a typical computer system having a large number of devices and/or device instances the load of these individual interrupts can overwhelm the processor and undermine the overall performance of the computer system. The primary contributor to the load on the processor is the number of interrupts that each device may generate. More specifically, as can be seen in FIG. 2, each device may comprise multiple device instances, and each device instance may generate a unique interrupt independent of the other device instances. In a typical computer system, the number of individual interrupts results in a large number of corresponding context switches having to be performed by the processor.

In order to alleviate the load on processor 140, and in particular the number of required context switches, particular embodiments may use gang interrupts. A gang interrupt may gang together multiple interrupt requests from the device instances of devices 120 and transmit them as a single gang interrupt. More specifically, multiple individual device instances (e.g., device instances 212 of FIG. 2) associated with devices 120 may be grouped together into different gangs. The interrupt requests from the members of a particular gang may be written into a bit vector (e.g., bit vector 216 of FIG. 2). After accumulating multiple individual interrupts, a single gang interrupt that includes the bit vector is generated. By including the bit vector, each gang interrupt that is generated may include information about the various individual interrupt requests received from its respective gang members. By generating only a single gang interrupt, the number of context switches required of processor 140 may be reduced. For example, if ten device instances all generate one interrupt request in a given cycle, the number of context switches required of processor 140 may be reduced by nine (only one context switch may be needed for a gang interrupt as opposed to ten context switches for the ten individual interrupts).

The rate at which gang interrupts are generated may be based on, for example, the amount of time that has elapsed or the number of interrupt requests that have been received since the last gang interrupt was generated. Because the gang interrupt comprises multiple individual interrupts from the various gang members, if one member of the gang is generating the majority of interrupt requests, the gang interrupt may become driven by that particular device instance. In such a scenario, computer system 100 may reduce the load on processor 140 by throttling or reducing the rate with which this particular device instance generates interrupt requests. Alternatively, if each of the members of the gang are generating an approximately equal number of interrupt requests, then no one device instance is dominating the gang. In such a scenario, computer system 100 may reduce the load on processor 140 by throttling or reducing the rate at which gang interrupts are generated. In some embodiments, a hierarchical throttling approach may be used. More specifically, multiple gangs can be created, and these gangs can themselves be ganged together. This may provide a scheduler associated with the computer system (e.g., an operating system scheduler) with flexibility in programming priorities, service levels, and rates. For example, it may allow the scheduler to combine or arrange gangs based on different priorities, service levels, or rates (e.g., interrupt coalescing control). Furthermore, in some embodiments, the scheduler may be programmed to follow process migration, virtual machine state, and other dynamic variables of the computer system.

In particular embodiments, there may be two layers of control for the rate at which processor 140 is interrupted. The first layer of control may limit or throttle the number or rate of interrupts generated by a particular device 120 (or device instance). The second layer of control may limit or throttle the number or rate of gang interrupts that are generated. In some embodiments, it may be desirable to initially throttle the interrupt rate of the individual devices 120 and then use the gang interrupt rate as a second control point to throttle any interrupts that are not individually throttled (e.g., a device for which there is no central control point or which the interrupt rate is unknown). This may be particularly useful in situations in which multiple virtual machines 132 are running on a single computer system 100. More specifically, each virtual machine may set individual interrupt rates for the relevant devices 120 and a hypervisor interfacing between virtual machines 132 and processor 140 may set a global interrupt rate for the gang interrupt. The global interrupt rate may allow for relatively efficient changes to the rate at which processor 140 is interrupted by avoiding the need to individually change the rate at which each of devices 120 generate interrupts. In certain embodiments, the throttling of the gang interrupt may allow for an additional layer of control without having to make changes to the functionality of devices 120 or their interrupt management scheme (e.g., devices 120 do not need to support the throttling of gang interrupts).

Devices 120 may comprise any hardware and encoded logic or software needed to perform the desired functionality of the respective device 120. For example, if device 120b is a network interface card, device 120b may include any hardware and encoded logic or software needed to communicate network traffic between a network and computer system 100. Devices 120 may include any of a plurality of different types of devices, such as internal devices, external devices, peripheral devices, or integrated devices. As mentioned above, each device 120 may support multiple device instances (e.g., device instances 212). Each device instance may be able to separately generate its own unique interrupt request for processor 140.

Memory 130 may comprise one or more computer readable memory modules. Each memory module may be any form of volatile or non-volatile memory including, without limitation, magnetic media, optical media, random access memory (RAM), read-only memory (ROM), flash memory, removable media, or any other suitable local or remote memory component or components. The memory modules that make up memory 130 may store any suitable data, instructions, logic or information utilized by computer system 100, including software embedded in a computer readable medium, and/or encoded logic incorporated in hardware or otherwise stored (e.g., firmware). In particular embodiments, memory 130 may store the logic used by computer system 100 in implementing the use of gang interrupts. In some instances, memory 130 may store bit vector 216. In particular embodiments, memory 130 may also store information associated with multiple different virtual machines 132 that may be running on computer system 100.

Each virtual machine 132 may represent a separate instance of, for example, an operating system running in an isolated manner. This may allow computer 100 to run multiple or different operating systems simultaneously. In doing so, virtual machines 132 may provide greater isolation between different applications running at the same time. This isolation may prevent, for example, virtual machine 132a from knowing what virtual machine 132b is doing.

The various virtual machines 132 may be managed by a hypervisor. The hypervisor may provide a common interface between the virtual machines 132 and processor 140. In particular embodiments, the hypervisor's application program interface (API) may be configured to allow processor 140 to bind an interrupt request to a particular gang. In particular embodiments, the hypervisor may also intercept the interrupt requests and join different device instances into particular gangs. The hypervisor may also present a top level interrupt request handler that then calls the interrupt request handlers of each of the individual gang members. Because each individual virtual machine 132 is unaware of what the other virtual machines 132 are doing and because the hypervisor manages the virtual machines 132 it may be desirable, in particular embodiments, for the hypervisor to set the rate at which gang interrupts are generated. This may allow the hypervisor to control the load on processor 140 without having to know or be able to control the individual interrupt rates of devices 120.

Processor 140 may comprise one or more processors and/or cores. Each processor may be a microprocessor, controller, application specific integrated circuit (ASIC), field programmable gate array (FPGA), or any other suitable computing device, resource, or combination of hardware and/or encoded logic or software operable to provide, either alone or in conjunction with other components, (e.g., memory 130) computer system functionality. Each processor or core of processor 140 may be able to handle a separate interrupt request independent of the other processors or cores of processor 140. Thus, if, for example, processor 140 comprises four cores then processor 140 would be able to handle four interrupt requests simultaneously.

In some embodiments, devices 120 may have their own respective processors, separate from the host processor, processor 140. The processor for each device 120 may be a microprocessor, controller, application specific integrated circuit (ASIC), field programmable gate array (FPGA), or any other suitable computing device, resource, or combination of hardware and/or encoded logic or software operable to provide, either alone or in conjunction with other components, the functionality associated with the respective device 120.

Although FIG. 1 illustrates a particular number and configuration of components within computer system 100, particular embodiments contemplate any number or arrangement of such components. For example, computer system 100 may contain fewer or more devices 120. In addition, elements of computer system 100 may include elements that are both internal and external to computer system 100 and/or each other. Furthermore, both devices 120 and computer system 100 may comprise one or more different interfaces that may be used to transmit communications, instructions, data or signaling. For example, they may both include an interface to a bus.

FIG. 2 illustrate a more detailed block diagram of the computer system of FIG. 1, in accordance with particular embodiments. More specifically, FIG. 2 comprises device 120d (which is a more detailed block diagram of device 120d of FIG. 1), processor 140 (which is a more detailed block diagram of processor 140 of FIG. 1) and gang device driver 220 which is functionally located between device 120d and processor 140 in this embodiment.

Device 120d includes multiple device instances 212, device interrupt table 214, and bit vector 216. Each device instance 212 may be capable of generating one or more unique interrupts. Each interrupt generated by one of device instances 212 may be stored in device interrupt table 214. In particular embodiments, as individual interrupts are received at device interrupt table 214, they may be written into bit vector 216. This may allow bit vector 216 to gang together the various interrupt requests generated by device instances 212 since the last gang interrupt was generated.

In particular embodiments, each device instance 212 may be able to generate one or more unique interrupts. Each unique interrupt may identify the particular device instance 212 from which it was generated (e.g., the interrupt request may include a device instance identifier, such as a bit string identifying a particular device instance 212) and may specify the type of interrupt (e.g., a bit string specifying a function to be performed by processor 140).

While only one device 120d is depicted, computer system 200 may comprise any number of devices. Each of the devices may also have any number of device instances associated therewith. While device 120d may have multiple device instances 212 associated therewith, each device instance 212 may be associated with only a single, specific device 120.

Device interrupt table 214 may be similar to a traditional interrupt table in that it is populated with individual interrupts from the various device instances 212. In certain embodiments, device interrupt table 214 may comprise one or more entries indicative of a particular interrupt service routine that is to be run by processor 140. These entries may be called by interrupt requests sent from one or more of device instances 212. However, instead of the individual interrupts resulting in an interrupt of processor 230, as in a traditional computer system, the individual interrupts are entered into bit vector 216. After a particular amount of time has elapsed or a particular number of interrupts have been generated, a gang interrupt may be generated and transmitted to gang device driver 220. In some embodiments, this may be referred to as the gang interrupt firing.

Bit vector 216 may comprise those interrupt requests that have been generated by device instances 212 since the last gang interrupt was generated. More specifically, each time one of device instances 212 generates an interrupt request, the interrupt request is written into bit vector 216. Eventually, a gang interrupt is generated which includes bit vector 216. Depending on the embodiment, bit vector 216 may be maintained in a variety ways. For example, in some embodiments, bit vector 216 may be maintained in a table within device 120d. As another example, in some embodiments, bit vector 216 may be maintained by software running on computer system 200. When bit vector 216 is maintained by software, it may be necessary to periodically scan bit vector 216 to determine its contents prior to generating a gang interrupt.

The gang interrupt may be generated on a periodic basis (e.g., once every microsecond) or upon receiving a certain number of interrupt requests from device instances 212. A scheduler associated with computer system 200 may adjust the rate at which the gang interrupt is generated. This may allow the gang interrupt to function as a control point for the operating system scheduler. More specifically, by allowing the scheduler to control the rate at which gang interrupts are generated, the scheduler may be able to help control the load device instances 212 place on processor 140.

In certain embodiments, the gang interrupt may be maskable. In such an embodiment, the gang interrupt may be masked when the gang interrupt is transmitted to the gang device driver. The gang interrupt may remain masked until the individual interrupt requests represented by bit vector 216 within the gang interrupt have been addressed, at which point the gang interrupt may then be unmasked. This process of masking and then unmasking the gang interrupt may allow individual interrupts that may be pending to be notified when processor 140 has finished handling the interrupts that were provided in the gang interrupt. This may allow computer system 200 to, in essence, ignore additional interrupt requests from device instances 212 until their current, respective interrupt requests have been addressed.

Once a gang interrupt, which includes bit vector 216, is generated it may be communicated to gang device driver 220. Gang device driver 220 may be functionally located between device 120d and processor 140. In particular embodiments, such as those using multiple virtual machines, gang device driver 220 may run in a hypervisor. Once gang device driver 220 receives a gang interrupt comprising bit vector 216, it may begin to call the individual device drivers 244 required to service the individual requests. In order to call the appropriate device drivers 244, gang device driver 220 may examine the bits of bit vector 216. Not only may gang device driver 220 determine which device drivers 244 to call, it may also arrange or schedule the order in which the individual interrupt requests are to be serviced by processor 140. Because all the individual interrupts of the gang interrupt are known, the individual interrupts from device instances 212 may be processed by processor 244 without requiring a context switch between each of the individual interrupts. As discussed above, this may reduce the load on processor 140 thereby allowing the number of devices and device instances associated with a particular computer system to become relatively large without requiring a corresponding increase in the number of CPUs and/or CPU cores.

In particular embodiments, instead of using bit vector 216 to communicate the completion of individual interrupt requests, gang device driver 220 may call each gang member individually to alert them that their respective interrupt request is complete.

In general, device drivers 244 may each include a computer program that allows the respective device instances 212 to interact with processor 140. Thus, each device driver 244 may be associated with a particular device instance 212 to provide interrupt handling for that respective device instance 212. Each device driver 244 may be called by gang device driver 220 based on information received in bit vector 216. As discussed above, gang device driver 220 may also determine the order in which device drivers 244 are called (e.g., based on the order they were received, the relative priorities of the interrupts, efficient handling by the processor, etc.). While the depicted embodiment shows four device drivers 244, the actual number of device drivers that may run con-currently may depend on the architecture of processor 140 (e.g., the number of processor cores or separate processors represented by processor 140). For example, in the depicted embodiment, processor 140 comprises four processing cores and thus may be able to simultaneously run four device drivers 244.

Thus far several different embodiments and features have been presented. Particular embodiments may combine one or more of these features depending on operational needs and/or component limitations. This may allow for great adaptability of computer system 200 to the needs of various organizations and users. For example, a particular embodiment may use multiple processors, each processor having multiple cores, to provide additional processing power. Some embodiments may include additional features.

Figure 3:
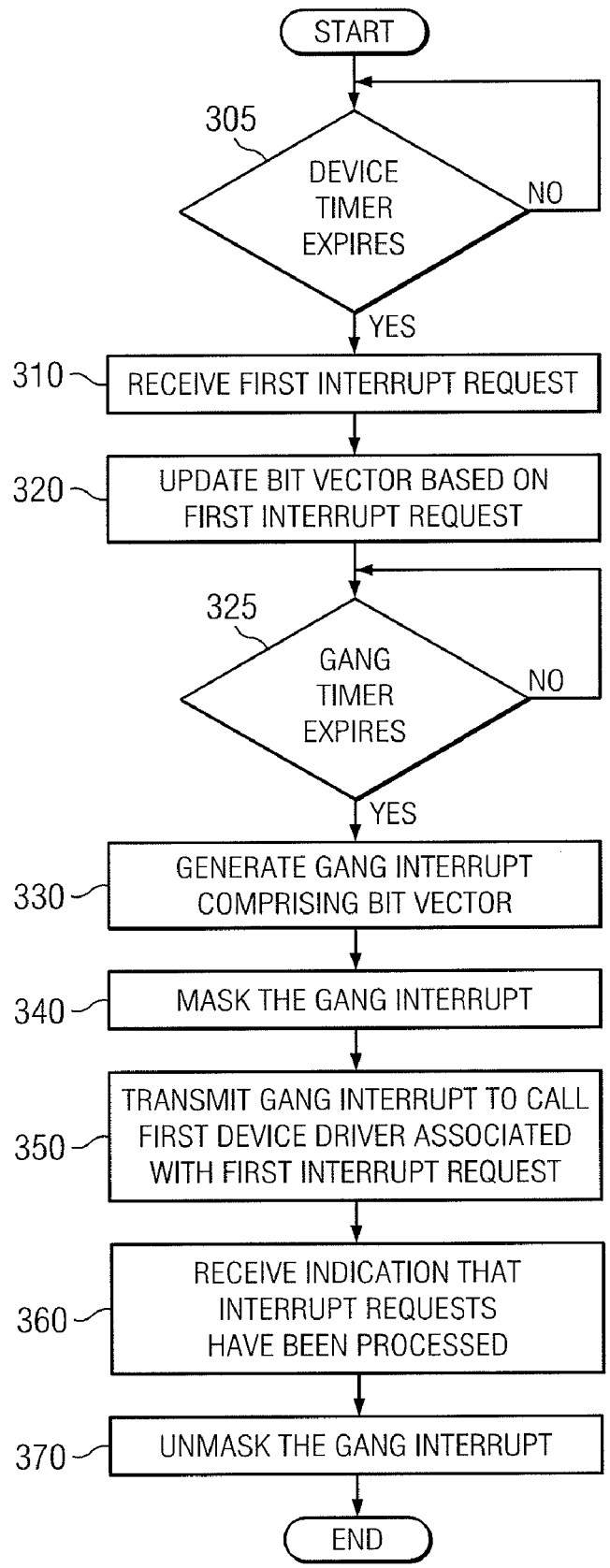
FIG. 3 illustrates a method for implementing gang interrupts, in accordance with particular embodiments.

FIG. 3 illustrates a method for implementing gang interrupts, in accordance with particular embodiments. In the embodiment depicted in FIG. 3 it may be assumed that the following steps are being performed by a computer system, such as computer systems 100 or 200 described above with respect to FIGS. 1 and 2. It may also be assumed that at least one gang has been created, composed of at least two device instances. The device instances that comprise the gang may, for example, be determined by the device maintaining the device instances or the host computer system.

The method begins at step 305 with the expiration of a device timer. The device timer may be based on a variety of factors such as elapsed time or the number of interrupt requests. Depending on the scenario, the device timer may modulate how often a device, or device instance, is allowed to generate interrupt requests.

At step 310 a first interrupt request is received. The interrupt request may be received from a particular device instance being run and/or maintained by a particular device within the computer system. While the first interrupt request has been designated as "first" it is not necessarily first in time. In other words, other interrupt requests may have been received before the first interrupt.

At step 320 a bit vector is updated based on the first interrupt request. As discussed above, the bit vector contains an array of bits based on the various interrupt requests that have been received. This may allow the bit vector to maintain the unique data associated with the individual interrupt requests. In some embodiments the bit vector may be direct memory accessed (DMA'ed) to the host computer system.

At step 325 the gang timer expires. Depending on the scenario, the gang timer may modulate how often the gang interrupt is generated. In particular embodiments, the combination of the device timer and the gang timer provides two layers of control. For example, the device timer may control the rate that individual interrupt request are generated and the gang timer may control the rate that gang interrupts are generated. While both timers may be used to control the load on the processor, there are situations (e.g., a computer system running multiple virtual machines) in which the interrupt load on the processor can not be completely controlled by the device timer alone.

At step 330 a gang interrupt is generated. The gang interrupt comprises the bit vector and thus all the unique information maintained therein. The gang interrupt may be used to signal to the host processor which device drivers need to be called and in what order the device drivers should be executed. Because a single gang interrupt comprises multiple individual interrupt requests the host processor is only interrupted one time per group of interrupt requests. This reduces the number of context switches required of the host processor.

At step 340 the gang interrupt is masked. This may help limit the number of individual interrupt requests that are generated because the various device instances may refrain from generating any additional interrupt requests while the gang interrupt is masked.

At step 350 the gang interrupt is transmitted. Transmitting the gang interrupt may call a first device driver associated with the first interrupt request. The timing of when the first device driver is called may depend, in part, on the other device drivers the gang interrupt may need to call as a result of any other interrupt requests that were received.

At step 360 an indication is received indicating that the interrupt requests have been processed. The indication may be received upon completion of all the individual interrupt requests within the gang interrupt.

At step 370, once the indication has been received, that the interrupt requests have been processed, the gang interrupt may be unmasked. This may, in effect, notify an interrupt table that the interrupt requests have been processed. Accordingly, the interrupt table may be updated to reflect the completion of the processing of the interrupt requests.

Some of the steps illustrated in FIG. 3 may be combined, modified or deleted where appropriate, and additional steps may also be added to the flowchart. For example, in some embodiments, the gang interrupt may not be masked (step 340) or unmasked (step 370. Additionally, steps may be performed in any suitable order without departing from the scope of particular embodiments.

Technical advantages of particular embodiments may include banding together multiple interrupts from multiple devices into a single gang interrupt. Accordingly, the processor component being interrupted may be able to more efficiently handle interrupts from a large number of devices.

Other technical advantages will be readily apparent to one of ordinary skill in the art from the figures, descriptions, and claims provided herein. Moreover, while specific advantages have been enumerated above, various embodiments may include all, some, or none of the enumerated advantages.

Although particular embodiments have been described in detail, it should be understood that various other changes, substitutions, combinations and alterations may be made hereto without departing from the spirit and scope of the disclosure. For example, although an embodiment has been described with reference to a number of elements included within computer systems 100 and 200 such as devices and processors, these elements may be combined, rearranged or positioned in order to accommodate particular computing needs. In addition, any of these elements may be provided as separate external components to computer systems 100/200 or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed:

1. A method comprising:

receiving a first interrupt request from a first device instance of a plurality of device instances, the first interrupt request requesting an interrupt of a host processor;

updating a bit vector based on the first interrupt request, the bit vector comprising a plurality of bits representing an accumulation of interrupt requests;

generating a single gang interrupt, the single gang interrupt ganging together multiple interrupt requests that may be transmitted as a single interrupt and comprising the updated bit vector comprising the plurality of bits representing the accumulation of interrupt requests; and transmitting the gang interrupt to call a plurality of device drivers at a particular time based on the bits in the bit vector.

2. The method of claim 1, further comprising:
receiving from the host processor an indication that the plurality of interrupt requests have been processed; and
updating an interrupt table upon receiving the indication that the plurality of interrupt requests have been processed.

3. The method of claim 1, further comprising throttling a rate at which the first device instance generates interrupt requests.

4. The method of claim 1, further comprising throttling a rate at which the gang interrupt is generated.

5. The method of claim 1, further comprising:
upon generating the gang interrupt, masking the gang interrupt; and
upon receiving from the host processor an indication that the plurality of interrupt requests have been processed, unmasking the gang interrupt.

6. The method of claim 1, wherein receiving a first interrupt request comprises receiving a first interrupt request from a first network interface card instance of a plurality of network interface card instances.

7. A system comprising:
an interface configured to receive a first interrupt request from a first device instance of a plurality of device instances, the first interrupt request requesting an interrupt of a host processor; and
a processor coupled to the interface and configured to:
update a bit vector based on the first interrupt request, the bit vector comprising a plurality of bits representing an accumulation of interrupt requests; and
generate a single gang interrupt, the single gang interrupt ganging together multiple interrupt requests that may be transmitted as a single interrupt and comprising the updated bit vector comprising the plurality of bits representing the accumulation of interrupt requests; and
wherein the interface is further configured to transmit the gang interrupt to call a plurality of device drivers at a particular time based on the bits in the bit vector.

8. The system of claim 7, wherein:
the interface is further configured to receive from the host processor an indication that the plurality of interrupt requests have been processed; and
the processor is further configured to update an interrupt table upon receiving the indication that the plurality of interrupt requests have been processed.

9. The system of claim 7, wherein the processor is further configured to throttle a rate at which the first device instance generates interrupt requests.

10. The system of claim 7, wherein the processor is further configured to throttle a rate at which the gang interrupt is generated.

11. The system of claim 7, wherein the processor is further configured to:
upon generating the gang interrupt, mask the gang interrupt; and
upon receiving from the host processor an indication that the plurality of interrupt requests have been processed, unmask the gang interrupt.

12. The system of claim 7, wherein the interface configured to receive a first interrupt request from a first device instance of a plurality of device instances comprises an interface configured to receive a first interrupt request from a first network interface card instance of a plurality of network interface card instances.

13. A computer system comprising computer readable memory encoded with logic that when executed by a processor is configured to:
receive a first interrupt request from a first device instance of a plurality of device instances, the first interrupt request requesting an interrupt of a host processor;
update a bit vector based on the first interrupt request, the bit vector comprising a plurality of bits representing an accumulation of interrupt requests;
generate a single gang interrupt, the single gang interrupt ganging together multiple interrupt requests that may be transmitted as a single interrupt and comprising the updated bit vector comprising the plurality of bits representing the accumulation of interrupt requests; and
transmit the gang interrupt to call a plurality of device drivers at a particular time based on the bits in the bit vector.

14. The computer system of claim 11, wherein the logic, when executed by the processor, is further configured to:
receive from the host processor an indication that the plurality of interrupt requests have been processed; and
notify an interrupt table that the first interrupt request has been processed.

15. The computer system of claim 1, wherein the logic, when executed by the processor, is further configured to throttle a rate at which the first device instance generates interrupt requests.

16. The computer system of claim 1, wherein the logic, when executed by the processor, is further configured to throttle a rate at which the gang interrupt is generated.

17. The computer system of claim 11, wherein the logic, when executed by the processor, is further configured to:
upon generating the gang interrupt, mask the gang interrupt; and
upon receiving from the host processor an indication that the plurality of interrupt requests have been processed, unmask the gang interrupt.

* * * * *